J. KOWALSKI.
COOKING UTENSIL.
APPLICATION FILED OCT. 23, 1911.
1,018,116.
Patented Feb. 20, 1912.
2 SHEETS—SHEET 2.
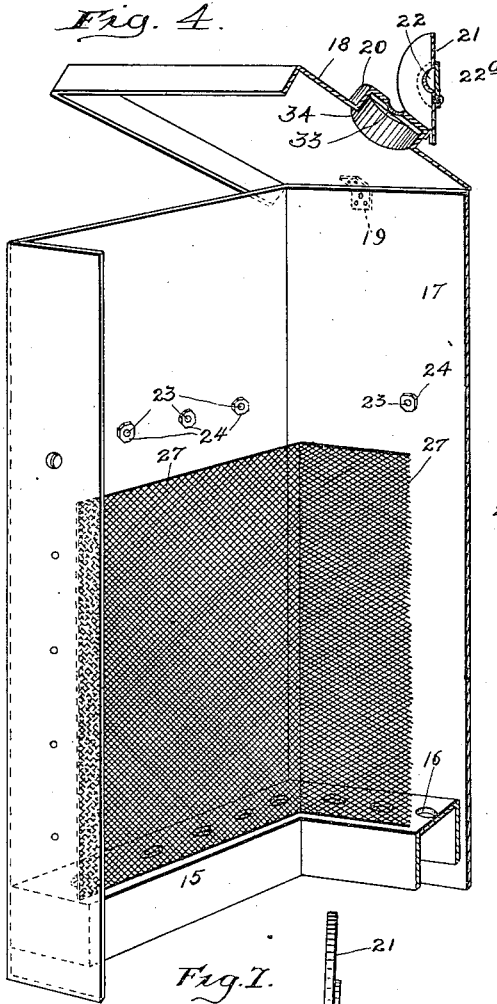
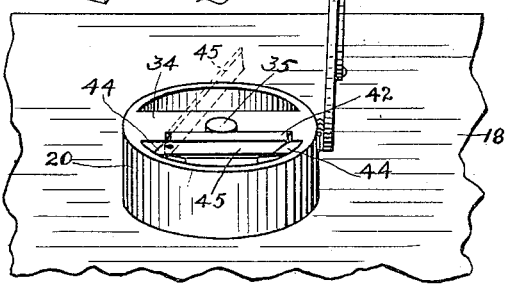
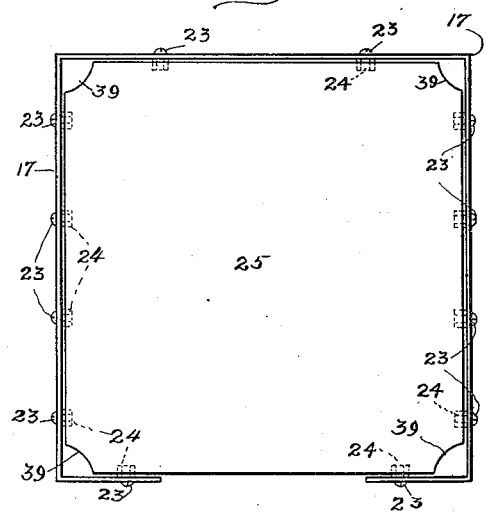
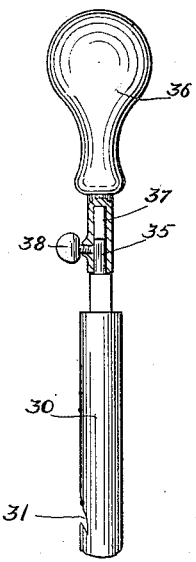
Witnesses:
Chas. E. Gorton.
E. Newstrom.
Inventor:
Julian Kowalsky.
By Chas. C. Tillman
Atty.

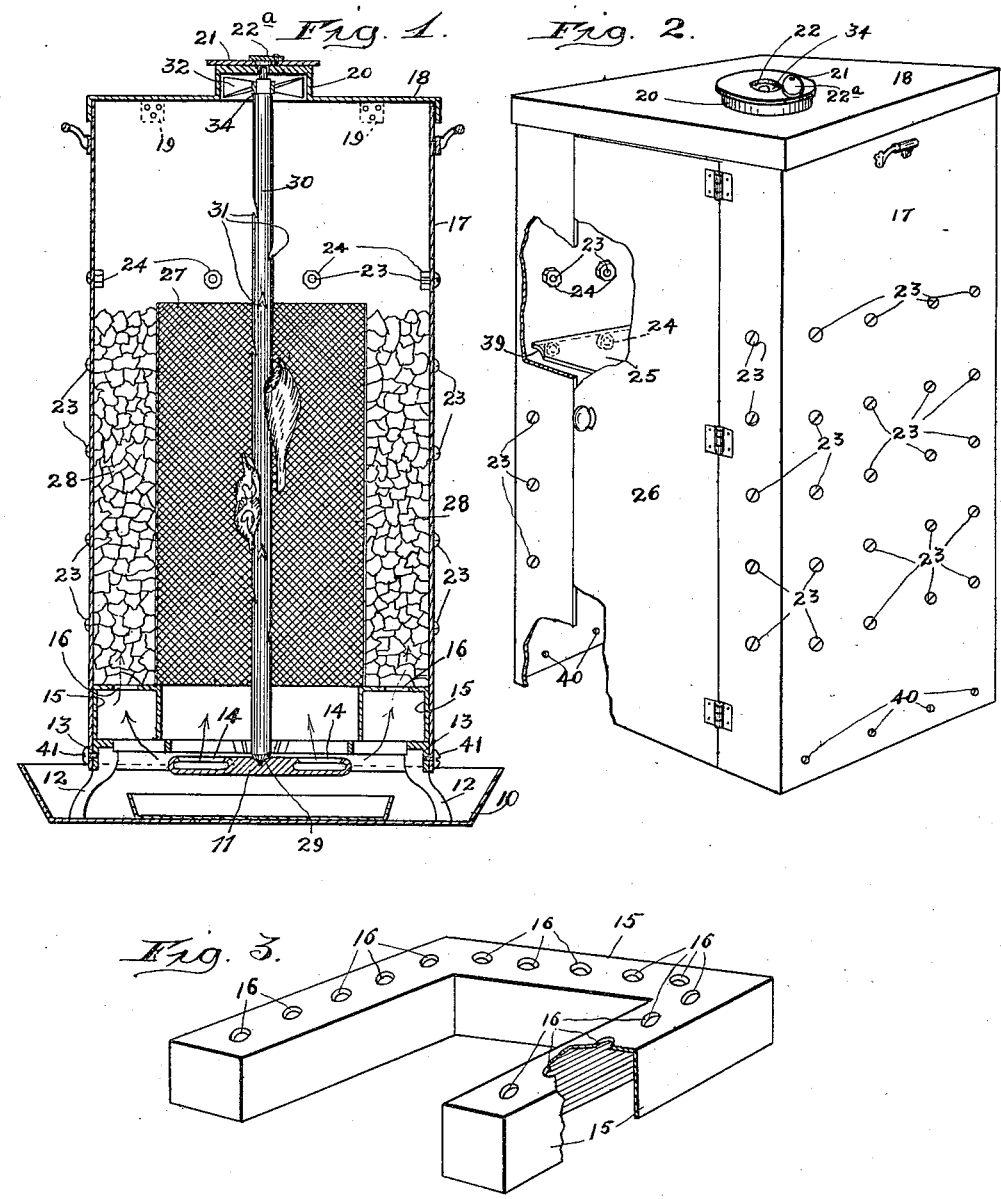

UNITED STATES PATENT OFFICE.

JULIAN KOWALSKI, OF CHICAGO, ILLINOIS.

COOKING UTENSIL.

1,018,116.  Specification of Letters Patent.  Patented Feb. 20, 1912.

Application filed October 23, 1911. Serial No. 656,096.

*To all whom it may concern:*

Be it known that I, JULIAN KOWALSKI, a subject of the Czar of Russia, residing at Chicago, in the county of Cook and State of Illinois, have invented certain new and useful Improvements in Cooking Utensils, of which the following is a specification.

This invention relates to certain new and useful improvements in an apparatus to be used for roasting or broiling meat, poultry, game, and the like, and it consists in certain peculiarities of the construction, novel arrangement, and operation of the various parts thereof, as will be hereinafter more fully set forth and specifically claimed.

The principal object of the invention is to provide an apparatus for roasting or broiling viands such as meat, poultry, game, and the like, which shall be simple and inexpensive in construction, compact in form, strong, durable, and efficient in operation, and so made, that the viands or articles being cooked, will be automatically rotated during this operation, thereby presenting them to the action of the fire or heat in such a manner as to bring about an equal cooking thereof.

Another object of the invention is to provide means whereby the viands may be cooked by means of a charcoal-fire or by means of gas.

A further object of the invention is to so construct the apparatus that the rotary carrier or support for meat and the like, as well as the retainer for charcoal, may be removed from the outer casing of the device, to the end, that shelves, pans, or grated holders for meats and other articles to be cooked can be placed therein and horizontally supported.

Other objects and advantages of the invention will be disclosed in the subjoined description and explanation.

In order to enable others skilled in the art to which the invention pertains, to make and use the same, I will now proceed to describe it referring to the accompanying drawings in which—

Figure 1, is a central sectional view of a cooking apparatus embodying my invention. Fig. 2, is a perspective view of the casing of the apparatus showing the charcoal retainer and the rotary support for meats and the like, removed therefrom, and illustrating the manner of horizontally supporting a shelf within said casing. Fig. 3, is a detached perspective view of the channeled base of the utensil. Fig. 4, is a sectional perspective view of a portion of the outer casing of the apparatus and a part of the charcoal retainer located in position within said casing. Fig. 5, is a plan view of the outer casing of the apparatus showing a shelf horizontally supported within the same. Fig. 6, is a view in side elevation of the upper portion of the rotary carrier of the apparatus showing a handle attached to the same for the purpose of its removal, and Fig. 7, is a plan perspective view of a portion of the lid for the outer casing showing the neck or chimney thereon and illustrating the means for journaling the upper portion of the rotary carrier therein.

Like numerals of reference refer to corresponding parts throughout the different views of the drawings.

The reference numeral 10, designates a receptacle, such as a pan in which a gas burner, of the ordinary or any preferred construction may be placed, which burner may be supplied with fuel in the usual or any well known way. In the present instance the gas burner, which is designated as a whole by the reference numeral 11, includes a frame 13, which has supporting legs 12, and also burner conduits of the ordinary construction which are mounted on the central portion of said frame.

Located on the upper surface of the frame 13, of the gas burner is a channeled base 15, which is made to form three sides of a rectangular figure and has in its upper surface a series of openings 16, for the passage of flames and heat from the gas burner. This base is placed on the frame 13, so that its open end will be at the front of said frame or adjacent to the user of the device.

Mounted on the frame 13, and surrounding the base 15, is a box-like casing 17, of sheet metal which extends upwardly to any suitable height and is provided at its upper end with a cover 18, which is preferably secured to the rear upper portion of the casing 17, by means of hinges 19. The central portion of the cover 18, is provided with an upwardly extended neck 20, which is also provided with a hinged cover 21, having therein a central opening 22, which may be partially or entirely closed by a damper 22$^a$, pivoted on said cover. The walls of the box-like casing 17, are provided with a series of projections, such as screws 23, arranged in horizontal rows and extended into the casing a slight distance as is clearly shown in Figs. 1, 2, 4, and 5, of the drawings, and may have nuts 24, on their inner ends to prevent them from becoming dislocated as well as to afford rests for a plate 25, which can be used for supporting articles of food to be cooked when the rotary carrier for viands is removed from the casing, the front part of which is provided with a door 26, which, when the casing 17, is in position on the burner frame, will register with the opening in the base 15.

Located within the casing 17, is a charcoal retainer 27, which is preferably made of reticulated material and so as to form three sides of a rectangular figure. This retainer rests at its lower end on the upper inner portion of the channeled base 15, and extends upwardly within the casing 17, at a distance from the side and rear walls thereof, but so as to contact with the inner surface of the front walls of said casing on each side of the doorway therein. By this arrangement it is apparent that as the retainer 27, is smaller than the casing 17, spaces will be provided between the walls of the retainer and the walls of the casing 17, which may be supplied with charcoal 28, which will rest on the upper surface of the base 15, so that it can be ignited by the flames from the gas burner.

Resting at its lower end in a suitable socket 29, in the central portion of the gas burner 11, is a rotary spit, rod or carrier 30, for the viands to be cooked, which carrier is provided with pointed projections 31, on which meat, poultry, or game can be supported and readily removed therefrom. The upper portion of the rod or carrier 30, has rigidly secured thereon a heat motor or fan 32, which is normally located in the neck 20, of the cover 18, of the box-like casing. The upper portion of the rod or carrier 30, is journaled in a suitable opening 33, formed in a piece 34, extended diametrically across the upper portion of the neck or chimney 20, so that when the heated air ascends and passes through the chimney or neck 20, and opening 22, in the cover of said chimney it will come in contact with the blades of the fan 32, and cause the rotation of the carrier 30, thus subjecting the viands supported by the carrier, to the heat generated by the charcoal, thus causing the viands to be uniformly cooked. The upper end of the rod or carrier 30, is reduced as at 35, and projects into the opening 22, in the cover of the chimney as is clearly shown in Fig. 1, of the drawings. When it is desired to remove the rotary carrier 30, the lid or cover 18, of the outer casing 17, may be raised so as to remove the same as well as the chimney 20, from over and around the upper portion of the carrier when a handle 36, having a socket 37, in its lower end to receive the reduced portion 35, of the carrier may be placed in position on said reduced portion and firmly held in place by means of a set screw 38, when it is apparent that the carrier with the viands thereon may be lifted out of the upper portion of the outer casing of the apparatus.

When it is desired to use gas only as a fuel for cooking, it is apparent that the retainer may be removed through the upper portion of the casing 17, and the charcoal 28, taken out of said casing, after which it is apparent that shelves 25, can be placed on the rows of projections 23, in the walls of the casing 17, so that they will be horizontally supported and will afford rests or supports for meat and other articles to be cooked. When using shelves 25, it is preferable to have the corners thereof cut away as at 39, so as to readily permit the heat to pass upwardly through the casing. The lower part of the casing 17, is provided with a series of openings 40, in which are located screws 41, to engage the outer surface of the frame 13, of the gas burner, around which the lower portion of the casing 17, fits, thus securely holding the casing in position on the burner. If desired, the casing 17, when equipped with the retainer 27, and channeled base 15, or when said parts are not used, can be bodily removed from the gas burner by loosening the screws 41, which engage the frame of said burner as before stated.

The cross piece 34, see Fig. 7, of the drawings, is provided on one of its sides with a longitudinally disposed recess 42, which recess communicates with the opening 33, in said cross piece. The ends of the recess 42, are beveled as at 44, to engage the correspondingly beveled ends of a latch 45, which is pivoted near one of its ends within the recess 42, to said cross piece. When the carrier 30, is placed in its vertical position within the casing 17, and retainer 27, the cover 18, as well as the neck or chimney 20, is turned down, in which operation the upper end of the carrier 30, may be placed in the opening 33, therefor by raising the latch 45, to the dotted position shown in Fig. 7, of the drawings, after which said latch may be allowed to drop back into the position shown by continuous lines in the last named figure, where it is obvious, it will securely hold the upper portion of the rod or carrier 30, against displacement.

Having thus fully described my invention what I claim as new and desire to secure by Letters Patent is—

1. In a device of the character described, the combination with a gas burner having a frame of an outer casing having a door in one of its walls and mounted on the frame of said burner, a charcoal retainer removably located in the casing at a distance from three of the upright walls thereof but in contact with its other upright wall, a vertically disposed carrier rotatably mounted at its lower end on the gas burner and extended through the said retainer and upper portion of the outer casing, and a hot air motor on the upper portion of said carrier.

2. In a device of the character described, the combination with a gas burner having a frame of a perforated channeled base mounted on the upper surface of said burner, a casing mounted on the burner frame and surrounding said base, the said casing having a door in one of its walls and a cover for its upper portion provided centrally with a neck or chimney, a charcoal retainer removably located in the casing at a distance from the rear and side walls thereof and having its front portion open to register with the doorway of the casing, a vertically disposed carrier rotatably mounted at its lower end on the gas burner and extended through the said retainer and into the chimney of the cover of the casing, and a hot air motor or fan mounted on the upper portion of said carrier.

3. In a device of the character described, the combination with a gas burner having a frame of a casing mounted on the frame of said burner and having a door in one of its walls, a cover for the upper portion of the casing provided centrally with a neck or chimney, a vertically disposed carrier rotatably mounted at its lower end on the gas burner and at its upper end within the chimney of the cover for the casing, and a hot air motor on the upper portion of said carrier.

JULIAN KOWALSKI.

Witnesses:
 CHAS. C. TILLMAN,
 E. NEWSTROM.

---

Copies of this patent may be obtained for five cents each, by addressing the "Commissioner of Patents, Washington, D. C."